US005513103A

United States Patent [19]

Charlson

[11] Patent Number: 5,513,103

[45] Date of Patent: Apr. 30, 1996

[54] METHOD OF ACQUIRING AND DISSEMINATING HANDICAPPING INFORMATION

[76] Inventor: Cary Charlson, 963 Auburn View, Cincinnati, Ohio 45206

[21] Appl. No.: 344,359

[22] Filed: Nov. 23, 1994

Related U.S. Application Data

[63] Continuation of Ser. No. 639,798, Jan. 10, 1991, abandoned.

[51] Int. Cl.[6] ........................ G06F 19/00

[52] U.S. Cl. ........................ 364/411; 273/DIG. 28; 348/157

[58] Field of Search ........................ 364/411; 273/DIG. 28; 340/323 R; 358/213.31; 348/157, 159

[56] References Cited

U.S. PATENT DOCUMENTS

| | | | |
|---|---|---|---|
| 2,590,389 | 3/1952 | Doyle . | |
| 2,641,523 | 6/1953 | Beckman et al. . | |
| 2,646,334 | 7/1953 | Marchand . | |
| 2,739,866 | 3/1956 | Oswald . | |
| 2,773,734 | 12/1956 | Normann . | |
| 2,819,942 | 1/1958 | Goodling . | |
| 3,240,135 | 3/1966 | Oswald . | |
| 3,502,009 | 3/1970 | Connors . | |
| 3,678,189 | 7/1972 | Oswald . | |
| 3,795,907 | 3/1974 | Edwards . | |
| 3,829,869 | 8/1974 | Balko et al. . | |
| 3,866,165 | 2/1975 | Maronde et al. . | |
| 3,883,684 | 5/1975 | Ikegami et al. . | |
| 3,890,463 | 6/1975 | Ikegami et al. . | |
| 3,946,312 | 3/1976 | Oswald et al. . | |
| 4,142,680 | 3/1979 | Oswald et al. . | |
| 4,253,753 | 3/1981 | Takahashi . | |
| 4,523,204 | 6/1985 | Bovay . | |
| 4,750,050 | 6/1988 | Belmares-Sarabia et al. | 358/311 |
| 4,752,764 | 6/1988 | Peterson et al. . | |
| 4,774,679 | 9/1988 | Carlin | 73/379.04 |
| 4,857,886 | 8/1989 | Crews . | |
| 5,103,433 | 4/1992 | Imhof | 368/9 |
| 5,136,283 | 8/1992 | Nobs | 340/799 |

*Primary Examiner*—Jack B. Harvey
*Assistant Examiner*—Xuong Chung-Trans
*Attorney, Agent, or Firm*—Wood, Herron & Evans

[57] ABSTRACT

A method of acquiring and disseminating handicapping information includes the steps of surveying racetracks to measure the distances between four split positions around the racetracks, and recording these distances. During thoroughbred races, all of the horses are recorded on videotape as they pass the successive split positions. The videotape includes time coded information which enables a determination of the elapsed time for each horse for each of the four recorded distances around the track. With the elapsed times and distances known, the average speeds for each of four segments around the racetracks are calculated, for all of the horses running at all of the racetracks. The average speeds are accumulated into a database, with one database for each horse. Subsequently, the databases for horses competing in upcoming races are made available to race fans to facilitate comparison of running capability on a consistent and accurate basis.

13 Claims, 4 Drawing Sheets

BRENNER PARK

| 80 | 81 Date | 82 Track | 83 Distance | 84 1st | 85 2nd | 86 3rd | 87 4th | 88 Place |
|---|---|---|---|---|---|---|---|---|
| Mr. Spoons | 6/19 | RD | 1m | 38.50 | 37.10 | 35.60 | 34.53 | 6 |
| | 6/28 | TP | 1 1/8m | 38.10 | 36.50 | 35.00 | 34.30 | 2 |
| | 7/5 | SD | 6f | 39.00 | 37.90 | 36.10 | 35.50 | 4 |
| Bold Strider | 6/25 | SD | 6f | 37.20 | 36.50 | 36.10 | 34.80 | 3 |
| | 7/3 | RD | 1m | 36.80 | 36.00 | 35.50 | 34.56 | 2 |

FIG. 4

METHOD OF ACQUIRING AND DISSEMINATING HANDICAPPING INFORMATION

This application is a continuation of application Ser. No. 07/639,798 filed Jan. 10, 1991, now abandoned.

FIELD OF THE INVENTION

This invention relates to a method of acquiring and disseminating handicapping information to assist racing fans in picking the winners of thoroughbred races.

BACKGROUND OF THE INVENTION

Every year, thoroughbred racing attracts thousands of spectators. For most of these spectators, the major attraction lies in paramutuel betting on the outcome of the races and the opportunity to win money. The term "handicapping" generally refers to comparative analysis of the various attributes of the competing racehorses in an attempt to predict which one will win the race. To increase the chances of "playing the horses" successfully, most racing fans rely upon one or more regularly published handicapping devices. Most handicapping devices supply information related to the past performances of the horses.

One such handicapping device is a daily publication that provides past performance data for every horse racing at every track across the United States. The past performance data includes, for each horse, information related to the last six or seven races. The information includes the place of the horse at the finish and its estimated distance behind the next fastest horse, and its place and estimated distance behind the next fastest horse at each quarter mile pole around the racetrack. For instance, if a horse is running third at the quarter mile pole, the number "three" is recorded, along with the distance of the third horse behind the second horse. Each estimated distance is usually given as a number of horse "lengths." If the distance is shorter than a length, the distance may be referred to as "a nose" or a "head." The performance data also includes the elapsed time for the winner to reach the finish line, and the elapsed time of the front running horse at each of the quarter mile poles around the track.

Although the information provided by this particular handicapping device or system may prove beneficial to some bettors, it has two major flaws. These flaws relate to the human limitations in acquiring this type of performance data and the inherent nature of the data that is recorded and used by the system.

To obtain performance data for this handicapping method, each racetrack employs a chart caller who watches the race from the pressbox, through binoculars, and calls out the places of the horses at each of the quarter mile poles along the track. For each horse called, the chart caller also estimates its distance behind the next fastest horse. For the lead horse, the distance ahead of the second place horse is estimated. An assistant located in the pressbox with the chart caller writes down the calls during each race, as the race occurs.

For all practical purposes, thoroughbred racehorses simply run too fast to permit an accurate calling of a race in this manner. Because the horses are often bunched together during a race, horses running further back in the pack will not actually be called until they have passed the reference quarter mile pole. Additionally, some horses may be blocked from the view of the caller and not readily identifiable, thereby further complicating the task of identifying each horse and estimating its distance behind the next fastest horse. Finally, the angle of the caller with respect to the horses at the turns of the racetrack does not lend itself to a high degree of accuracy in judging distances between horses. These factors all produce some degree of inaccuracy in the recorded past performance data used by this handicapping method.

Additionally, some inherent inaccuracy is built into the system because of the dimensional unit used to measure relative positions. In practice, there is some discrepancy as to what is meant by the term "length" when referring to a distance. For some, this term designates the distance from the nose of a horse to the tail of the horse. However, not all horses are the same size, and even for the same horse, this distance varies during the stride as the horse extends its forward legs and then gathers its rear legs. In effect, lack of a concise definition for the unit of measure commonly used in assessing performance produces another degree of inaccuracy.

In addition to the above factors, which generally relate to the human limitations of this handicapping system, another major flaw associated with this handicapping system results from the fact that the recorded, past performance data is based upon the position of a racehorse relative to other horses. The use of relative performance data creates the impression that it provides information as to a horse's capability of advancing through the pack as a race progresses. However, this is not always true. In some instances, relative position data does not readily provide an indication of whether a horse is actually gaining on or closing the distance to the lead horse. As an example, a horse may be in third place, one length behind the second place horse, both at the first quarter mile pole and the second quarter mile pole. Furthermore, both the second and third place horses could be gaining on the first place horse during this distance. Nevertheless, a race fan would not necessarily realize this fact unless he or she located the relative position data related to the first and second horses for that particular race, or calculated the split times of the lead horse for that quarter mile. Although this information may be obtainable, it is not readily available for quick and easy comparison of a large number of horses competing in upcoming races.

In short, relative position information from past races tends to overemphasize one aspect of a horse's performance, i.e., its place in the pack and its proximity to another horse. As a result, even if the called places and distances are accurate, the relative position information provided by this system is only moderately helpful in accurately predicting the winners of horse races.

Other attempts have been made to provide accurate performance data to assist racing fans in handicapping thoroughbred racehorses. One such attempt is disclosed in Oswald et al. U.S. Pat. No. 4,142,680, a patent which describes a system for indicating the elapsed time for each racehorse in a race from the start to each of a succession of stations, such as furlong posts, along a racetrack. In order to obtain elapsed time for all the horses at the successive stations, each horse has a transmitter mounted to its forehead. Each transmitter transmits a radio frequency that identifies that particular horse, and that frequency is received by a receiving loop buried in the track as the horse passes thereabove, within reception range. There is one receiving loop for each transmitter, or for each horse in the race. The receiving loops communicate to a detector to generate output signals which identify the horse and the elapsed time of the race for the horse to reach that particular location of the track. As an end result, the object of the system is to provide split times for each racehorse at each of the receiving loop locations along the racetrack.

While the information obtained with this system may be helpful to race fans in handicapping racehorses, this particular method for obtaining split time information has not proved successful. First, depending upon race conditions, a transmitter mounted to a horse will be subjected to all of the same environmental conditions that the horse experiences during a race. Namely, depending upon the condition of the track, the transmitter is susceptible to being covered by mud, dirt, or sod, any of which could impair or ruin transmitting capability.

Second, regardless of size, mounting a transmitter to a racehorse represents additional weight that a horse must carry, and one more piece of equipment that must be checked by the jockey prior to the race. Many jockeys and trainers object to the addition of any extra equipment on the horse.

Third, the use of transmitters and receivers to obtain split times would produce radio interference and most likely be objected to by the Federal Communication Commission, particularly if a racetrack is geographically near an airport, where radio interference could be disastrous.

Fourth, it would cost a great deal of money and take a substantial amount of time to bury the receiving loops underneath the racetrack at each of the stations. This would have to be done in the off-season, and extensive maintenance to the receiving loops during the racing season would probably not be possible. Yet, the success of the system would depend upon proper functioning of all the loops throughout the entire season.

Finally, once the receiving loops were in place, they would only be able to provide split time information for that particular location along the racetrack. If the rail of the racetrack were to be moved inwardly or outwardly along the turns, which has been required in some states for safety reasons, the distance around the track will change. However, the locations where split times are measured would still remain the same. As a result, either the loops would have to be dug up and moved, at significant expense to the racetrack, or the distance variations of the track would have to simply be ignored.

If the distance variations were ignored, and if this occurred at enough tracks in the system, the recorded split times would simply not be legitimately comparable. As a result, the split time information obtained by this system would probably not be particularly useful in predicting winners.

For these reasons, this Oswald system has apparently not been successful. Applicant is not aware of any racetrack that employs this method for handicapping racehorses.

Goodling U.S. Pat. No. 2,819,942 discloses a photo-finish camera that records the places of horses at a finish line. A photofinish camera includes a lens which focuses the viewed image through a slit and onto the film. The camera is pointed at the racetrack, and the slit is aligned along the finish line. In order to work, the film must move past the slit at a constant speed, about the same speed that the horses are running, but in an opposite direction. Otherwise, the lengths of the horses will appear distorted. The film used in the Goodling camera includes numerical information along an edge thereof. For each horse, the number on the film corresponds to the elapsed time for that horse to reach the finish line of the race.

Photo-finish cameras of this type, with elapsed time information, have proved useful in obtaining information related to a horse's performance at a given track for a particular distance. However, they are not particularly accurate in comparing different performances of the same horse at various tracks, or for comparing the performances of other horses that have previously raced at other tracks.

This is partially due to the idiosyncrasies among various racetracks in measuring an actual race distance. Most racetracks do not start the official race clock when the horses leave the gate, but when they reach the next closest furlong pole. A furlong is an eighth of a mile. The distance of a thoroughbred horse race is usually given according to the number of furlongs. For a mile long race on a race track that is one mile around, the clock starts when the horses initially reach the finish line, several seconds out of the gate. The official clock then runs until the horses complete one entire lap. In other words, at the "official" beginning of the race, the horses already have a running start. While most tracks are relatively consistent in placement of the starting gate with respect to the closest furlong pole or quarter mile pole, for a particular distance, this distance may vary substantially from track to track, despite the fact that the "official" distances would all be considered the same. Therefore, assuming that the official distances of the racetracks are accurate, the horses actually run different distances at different tracks, depending on the location of the starting gate. For a horse that is a "closer", i.e., one that finishes strong, this discrepancy could have a tremendous effect on the horse's finish, particularly at a racetrack with a longer gate to finish distance.

While it would seem that this problem could be solved by simply locating the starting gate at the finish line, such relocation would present additional problems in moving the starting gate off of the track in sufficient time to enable the horses to run through after a lap has been completed. Additionally, all racetracks would have to agree to this change and to the use of a standard distance, a prospect which does not seem likely. Moreover, this solution becomes even more impractical when considering the multiplicity of racing distances that are used by racetracks. Applicant is aware of one racetrack that regularly uses twenty four different racing distances.

Another discrepancy among racetracks further negates the usefulness of such finish line data. Applicant has learned that, for some racetracks in North America, the "official" distance around the tracks does not match the actual distance around the track. Therefore, if two horses ran exactly one lap around two racetracks with the same "official" lap distance, there is a very real possibility that these two horses would actually run different distances. As a result, the finish times for these horses at the two different racetracks would probably not be legitimately comparable for accurate handicapping. With multiple racetracks, this inaccuracy compounds.

In short, while a photofinish camera of the type described in the Goodling patent may be somewhat helpful in assessing the relative performances of horses that have performed at the same racetrack over the same distance, the information is not particularly helpful for predicting how a horse will run at other racetracks, for the "same" or different distances, or against horses that have run at other racetracks.

SUMMARY OF THE INVENTION

It is an object of this invention to provide a method for acquiring and disseminating highly accurate handicapping information in a relatively simple and cost effective manner.

It is another object of the invention to regularly supply handicapping information that promotes accurate comparison of the past performances of thoroughbred racehorses, regardless of which of a variety of racetracks the horses have previously performed.

This invention contemplates a method of acquiring and disseminating thoroughbred racehorse handicapping information by:

a) surveying a racetrack to identify and measure split positions around the racetrack;

b) indexing a high resolution video camera to each of the successive split positions during a race to record all of the horses on videotape at each of the split positions;

c) determining from the videotape the elapsed time for each horse between successive split positions;

d) calculating and storing, from the elapsed times and the known distances, the average speeds for all the horses between successive split positions; and e) compiling, publishing and/or providing, on a regular basis, access to the average speeds of horses that are competing in upcoming races.

By performing steps a) through d) at each racetrack in a racetrack circuit participating in this handicapping system, average speeds for every horse that runs on that racetrack circuit may be calculated. Subsequently, when the racetracks inform personnel at the central processing station which entries will perform in upcoming races, the average speeds for horses competing in a race may be grouped together and printed for race fans.

By comparing and evaluating the average speeds of horses at positions around the racetracks, racing fans will have a better chance of predicting the winners of horse races. This conclusion is based upon applicant's years of experience and his observations that the racing capability of a thoroughbred racehorse is most accurately measured by its actual running speed, and that the most consistent manner of accurately handicapping horses on a comparative basis should be based on comparison of average speeds.

While this objective is rather simply stated, the achievement of an economical, practical manner of obtaining this average speed data required a full understanding of prior handicapping systems and the limitations associated therewith. Perhaps more importantly, the achievement of a practical, working method for obtaining average speeds required an understanding of the distance discrepancies among various racetracks and the variations in the distances between the starting gate and the location where the official clock is started among various racetracks. In short, it is important to know the "actual" distances rather than the official distances, along with the various distances from gate to the location for starting of the clock.

Because applicant's method involves the initial step of surveying and identifying measured split positions at each of the racetracks, the actual distances to the split positions for each racetrack in the system are known. However, the published data relates to average speeds, rather than distances covered, so there is no need to identify which racetracks are "longer" or "shorter" than the others. If desired, for each horse in each race, the average speed over the entire race can also be printed with the handicapping information, in addition to the average speeds over each of the successive segments of the racetrack.

In carrying out this inventive method, the steps of surveying the track to identify and measure split positions and the recording of the distances between the split positions are performed at each racetrack within each horse racing circuit participating in the handicapping system. The distances between split positions are recorded and preferably stored in a computer. For every distance that is run at the racetrack, the split positions must be measured and recorded. For each of the distances, the marked split positions will break the race down into four segments that are roughly equal in length, although it is not critical that they be exact. The split positions may be marked by painting a mark on the rail or by implanting a white post into the ground.

During the racing season, one operator equipped with a high resolution camera and lens records all of the races on videotape. To record a race, the operator points the camera at the starting gate and begins videotaping prior to firing of the starting gun. The lens of the camera preferably includes a cross-hair for precise alignment toward the marks for the split positions. After the gate opens, the camera is immediately indexed to the first split position, and it is maintained at that position until all of the horses have passed. After the horses have passed the first split position, the camera is indexed to the next split position, and it remains there until all the horses have passed. Similarly, the camera is indexed to each successive split position, and eventually, it is indexed to the finish line of the race. A computer controlled device may be used to automatically index the camera to preset position associated with each of the split time positions, with each indexed movement occurring upon depression of a button by the operator. It may also be desirable to index the camera to a marker relatively close to the starting gate to obtain data for determining an average speed related to starting capability.

After all the races have been recorded on videotape, preferably color videotape, the operator mails the films to a central processing location. The operator also mails a program of the day's races, so that the names and numbers of the horses can be readily identified by personnel at the central processing location. The program also assists personnel in instances where the horses are running in a tight pack around the course, because the program indicates the colors of the silk worn by each jockey. If a number is not readily ascertainable, a horse can be identified on videotape by the color of the jockey's silk.

At the central processing location, an operator replays each race videotape to determine the average speeds of all of the horses at the split positions passed during the races. Before replay, the operator retrieves the stored distance information of the split positions for the racetrack being reviewed, for that particular racing distance. Then, while replaying the video, frame-by-frame if necessary, the operator identifies each horse as it reaches the split position in view. For each horse and at each split position, the time code on the videotape that is associated with that frame is retrieved. With the distances, the time and the horses known, average speeds can be calculated and recorded in a database.

A database for each horse is maintained, with each database including the date of a race, the location of the race, the distance of the race and the average speeds for each of the split positions passed during the race. Over a period of time, average speeds from additional performances are also recorded and accumulated in the database.

The average speed databases are preferably stored in a computer at the central processing station. The number of entries stored depends upon available memory. The distances to the split positions for each racing length of each of the racetracks are also stored in memory in the computer. To further automate the system, the replaying/identification steps are performed on a video playback machine that automatically reads the time code and feeds it directly to the computer for pairing with the recalled distance. Input of the horse's identity could also be automatic, via a keyboard or by color recognition.

Subsequently, the various racetracks notify personnel at the central processing location as to which thoroughbred racehorses will be competing in upcoming races. The average speeds for these horses may be recalled from memory and grouped together for printing, transmitting or otherwise disseminating the information to racing fans.

The average speed information may be printed upon a separate form supplied to the racetracks independently, or it may be supplied to the newspapers or the racetracks themselves via a modem and telephone line connection with the computer at the central location.

If desired, other additional information may also be supplied with the average speed data. Such information may include reference to where a horse was located on the track at each split position, i.e., either adjacent the rail or not. Other probable information would indicate the owner, the trainer, the weight, equipment worn, i.e., wraps, track conditions.

These and other features of the invention will be more readily understood in view of the following detailed description and the drawings.

BRIEF DESCRIPTION OF THE DRAWINGS

FIG. 4 depicts the past performance average speeds of two sample entries and is exemplary of the type of handicapping information that would be disseminated to race fans in accordance with a preferred embodiment of the invention.

DETAILED DESCRIPTION OF THE DRAWINGS

Figure 1:
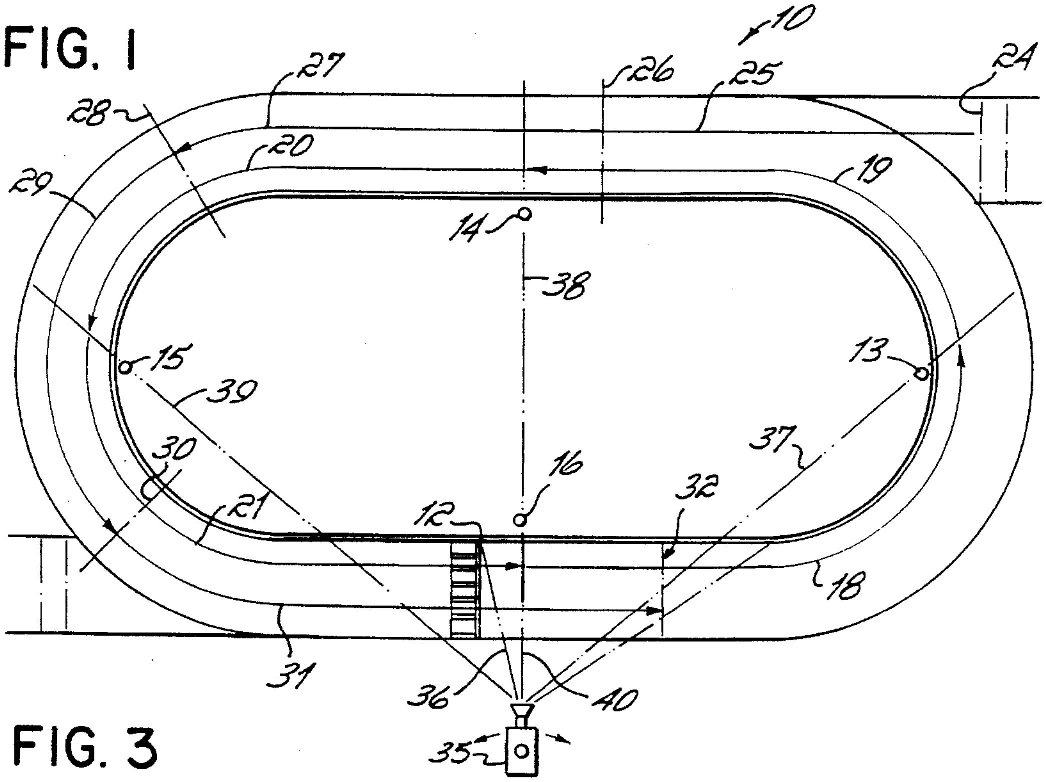
FIG. 1 is a schematic showing a racetrack and several line of sight paths toward the split positions that a camera will point when indexed during a thoroughbred race, in accordance with a preferred embodiment of the invention.

FIG. 1 shows a racetrack 10 that has been surveyed in accordance with a first step of this inventive method. The survey measures the distance between successive split positions 12 and 13, 13 and 14, 14 and 15 and 15 and 16. These split positions will be used for a race of a distance of once around the track. Split position 12 corresponds to the starting gate from which the horses break at the beginning of the race. Split position 13 is located about one-quarter of the way around the track, and it may be proximate to a location on the track commonly referred to presently as the "quarter pole," but this is not actually required. The actual marker used to identify location of split position 13 may or may not be the same as the posted quarter pole of the racetrack, depending upon the results of the survey. Preferably, the split position 13 is marked with paint on the rail that traverses the inner circumference of a racetrack. Alternately, a post could be implanted in the ground inside of the rail.

Numeral 18 designates a first measured segment or distance of the racetrack 10 between split position 12 and split position 13. Similarly, numeral 19 designates the second segment of the racetrack 10 between split position 13 and split position 14. Numeral 20 designates the third segment of the track 10 from split position 14 to split position 15, and numeral 21 designates the fourth segment of the racetrack 10 from split position 15 to split position 16, which is located at the finish line. Because there may be some human error or inadvertence in placement of the starting gate, it may be necessary to put several marks on the rail. Then, with the gate in view and the different distances between each of these marks and the finish line known, the exact value for first segment 18 can be calculated.

For races of different distances, the marking and measuring of other split positions and measured distances is necessary. For each distance that is raced, the marked split positions roughly divide the racetrack 10 into quarters. FIG. 1 also shows split positions for a six furlong race run on a mile long track. The starting gate is located at the beginning of the backstretch, as at split position 24. The numeral 25 designates the first measured segment of the shorter course from split position 24 to split position 26. The measured distance 27 designates the second segment of the shorter course from split position 26 to split position 28. The measured distance 29 designates the third segment of the shorter course from split position 28 to split position 30, and the measured distance 31 designates the fourth segment of the shorter course track from split position 31 to the finish line, at split position 32.

For each distance that is raced at all the racetracks in the system, the actual distances to four successive split positions are recorded and preferably stored in a computer memory associated with the particular racetrack. In the memory, the distances of the four segments may be coded for easy retrieval. For instance, the retrieval signal distances may be coded to the total "official" racing distance. For each racetrack, these surveying and marking steps are also performed for each racing surface, i.e., dirt or grass.

A location 35 designates a position for setting up a video camera to record the racehorses as they pass the split positions during the races. Preferably, the video camera will be located either in the pressbox or on top of the pressbox to provide an unobstructed view to the various split positions. The camera is preferably mounted on a tripod and is pivotal to aim at the various split positions during a race. FIG. 1 shows a line of sight 36 that extends from location 35 to split position 12, which is located at the starting gate for a race distance of one lap around racetrack 10. Line of sight 37 extends from location 35 to split position 13. Line of sight 38 extends from position 35 to split position 14, and line of sight 39 extends from position 35 to split position 15. Line of sight 40 extends from position 35 to split position 16. Lines of sight to split positions 24, 26, 28, 30 and 32 are not shown.

During a race, an operator points the video camera at the split positions, in succession, as the horses circle the track 10. The video camera could be automatically indexable by computer control so that the operator would simply press a button to move the video camera to the next split position. This could be accomplished by modifying a Canon U-4 remote control pan-tilt system. For automatic indexing of a race, the total distance of the race for that particular track would initially have to be input to index to the correct series of successive split positions upon successive depressions of the button.

For day time racing, applicant has used a Hitachi camera Model No. SK-F1/-FS with a Canon Field lens Model No. J50X9.5B IE to identify thoroughbred racehorses at the successive split position as they circle the racetrack 10. The videotape in this camera travels at a speed of 29.97 frames per second and provides extremely high accuracy in identifying horses as they reach the split positions. At this speed, considering the normal running speeds of most thoroughbred horses, i.e., roughly about 35 mph, most thoroughbred racehorses travel about 7–9" between successive video frames. This ensures a high degree in accuracy in presenting average speeds. For night time racing, an Ikegami camera Model No. HL-87M, equipped with the same Canon lens, would be suitable. At the video speeds necessary to identify racehorses, particularly at night along the backstretch, prior electron tube cameras do not provide sufficient resolution to identify the racehorses.

To obtain the average speeds, the race must be reviewed to identify the racehorses and their corresponding elapsed times for each split position. Review is done at a central processing station on a video playback device.

Figure 2A:
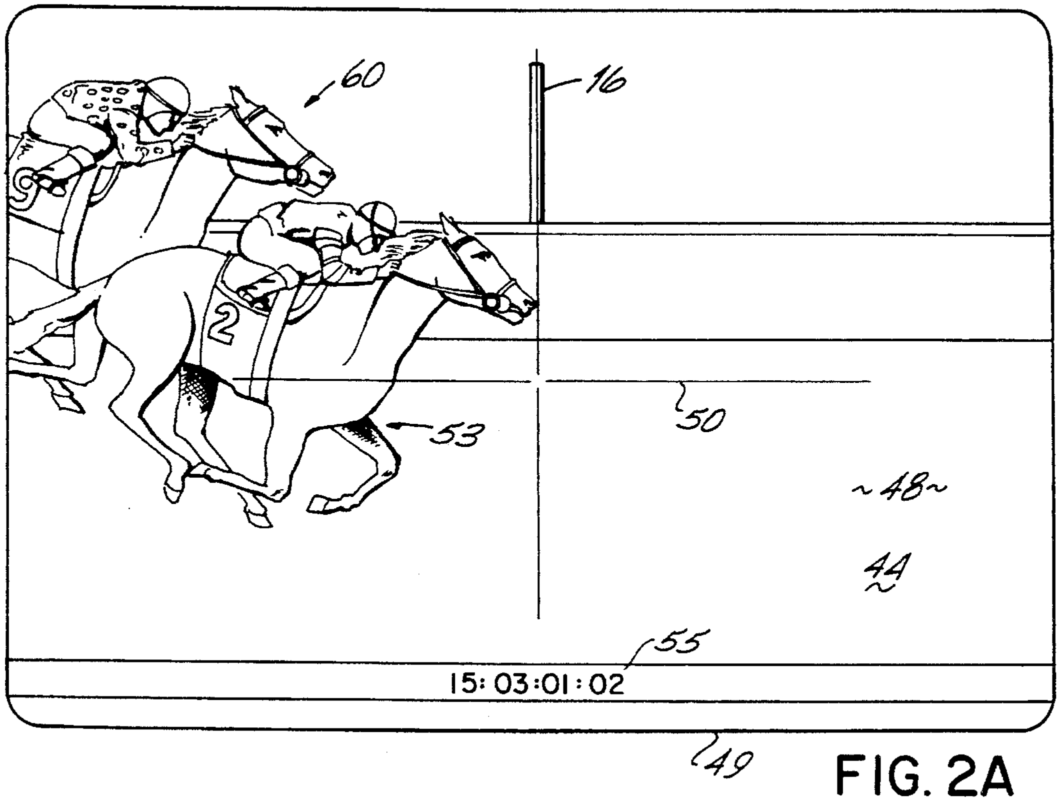
FIGS. 2A and 2B schematically show the view on a video playback screen for frames of a videotape used to record a thoroughbred race in accordance with a preferred embodiment of the invention.
Figure 2B:
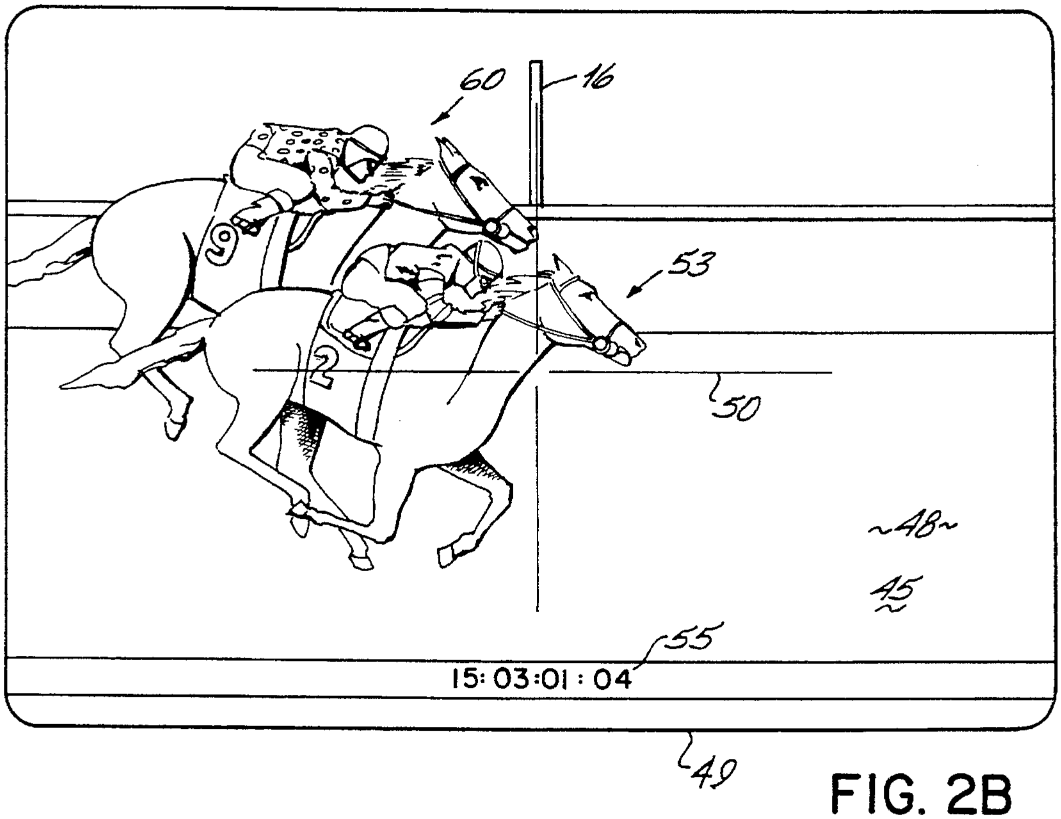

FIGS. 2A and 2B show frames 44 and 45 of videotape 48, as viewed on a screen 49. Note that a cross-hair 50 appears on each of the frames. During recording of the race, the cross-hair 50 is preferably aimed at a spot about two feet inside the rail of the split position marker. For instance, in FIGS. 2A and 2B, cross-hair 50 is aimed inside a marker for split position 16. Frame 44 shows horse 53 as it reaches split position 16. A time code 55 embedded adjacent an edge of the videotape 48 contains time code information related to elapsed video running time prior to exposure of that particular frame 44. For FIG. 2A, the time coded information is 15:03:01:02. From the stored distance 21 and the elapsed time retrieved from the time code for frame 44, the average speed of horse 53 over segment 21 is calculated. The videotape 48 is then advanced to place the next horse 60 at split position 16, as shown in FIG. 2B. The identity of horse 60 is recorded and the time 15:03:01:04 is obtained from time code 55. It is noted that these two frames 44 and 45 are not successive, but they have one frame between them that is not shown. The average speed for horse 60 over distance segment 21 is then calculated. Similarly, the operator at the central processing station advances the videotape through the race, frame-by-frame if necessary, to identify each horse as it reaches each split position and to retrieve the time coded information from the viewed frames that correspond to those split positions.

Preferably, with distances stored in a computer memory, the time codes are read by the playback device into the computer to facilitate average speed calculation. Only the identity of the horse would have to be input manually. As a further development, the horse identity may be read automatically with the aid of color sensors that identify a horse by the color of a jockey's silk.

Because the videotape 48 must be started before the horses break out of the starting gate, the time coded information corresponding to the first frame which shows the horses running will not be zero on the time code 55. Therefore, the operator must know how much time has elapsed between initiation of video recording and opening of the starting gate. If the codes are machine read, the operator must input information into the computer related to that frame of the videotape during which the race was started, or when the gun went off. When the race is replayed, the time coded value corresponding to the frame viewed at the completion of the first segment is subtracted from the time coded information value for the frame that corresponded to gate opening.

Figure 3:
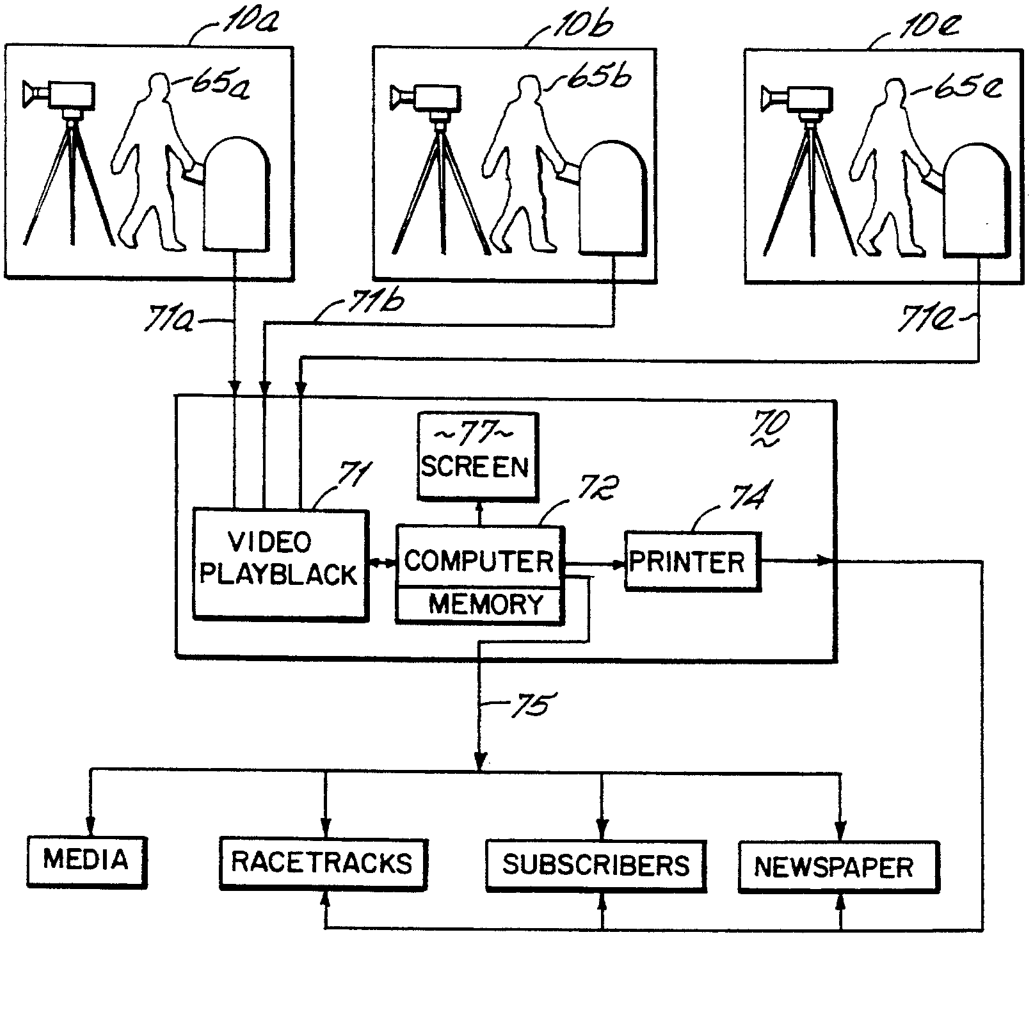
FIG. 3 is a schematic outlining a preferred method of acquiring and disseminating handicapping information according to a preferred embodiment of this invention.
Figure 3A:
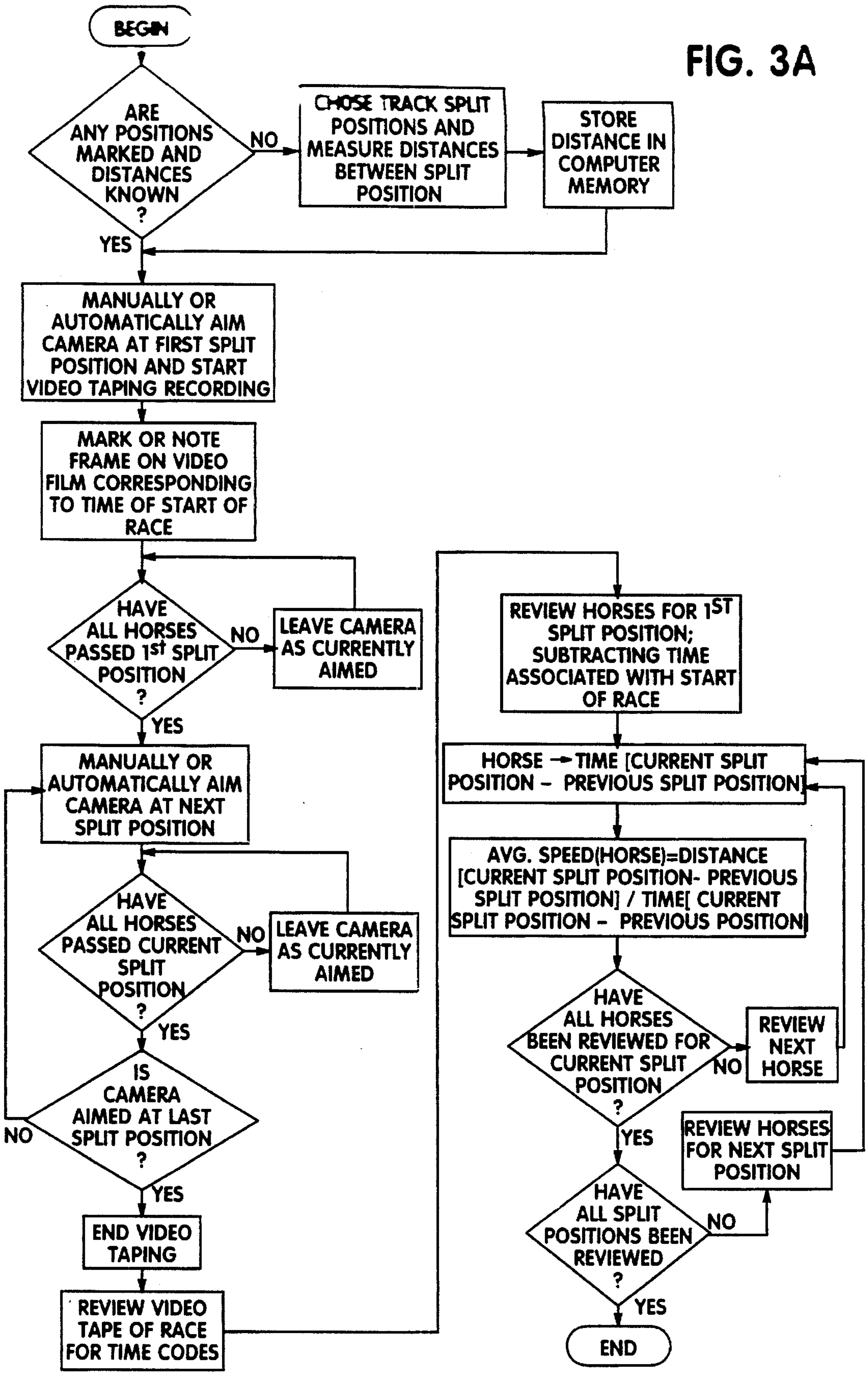
FIG. 3*a* is a flowchart which illustrates the particular method steps in the invention.

FIG. 3A is a flowchart which readily illustrates the particular method steps in the invention. While each step of the invention as shown in the flowchart is discussed hereinabove in the text to allow a person of ordinary skill in the art to practice of the invention, the flowchart of 3A graphically illustrates the steps and is simply another way of showing the invention as it has been described herein.

FIG. 3 shows a schematic for acquiring and disseminating average speeds for a plurality of horses that race at a large number of racetracks, designated as track 10*a*, track 10*b* . . . track 10*e*. Each of the tracks within the system employs a cameraman 65*a*, 65*b* . . . 65*e* to record the races. After recording, the cameramen mail the videotape or videotapes, along with a program, to a central processing location 70. Lines 71*a*, 71*b*, . . . 71*e* designates mailing of the videotape and program to central location 70. At the processing location 70, an operator reviews the races on a video playback device 71 to identify each horse and retrieve the necessary time and distance information for calculating average speeds over the four segments of the race.

The playback device 71 preferably communicates with a computer 72 that includes memory. The computer 72 recalls the distances from memory, matches an identified horse and time to the distance, calculates the average speed and then stores the average speed. Over a period of time, a database in memory at the computer 72 accumulates average speeds for each horse, for a number of additional races, depending upon the available memory space.

To disseminate the average speeds to racing fans, the stored information for horses scheduled to compete in upcoming races is recalled from memory by the computer 72 and then printed upon a printer 74, transmitted to a subscriber via telephone line 75 or displayed on a screen 77. Typically, a thoroughbred racehorse races about once every 7 to 10 days. The various racetracks within the systems generally know the entries for upcoming races about 4 days in advance. This provides sufficient lead time for personnel at the central processing station 70 to recall, group together and disseminate the average speeds for horses that will compete in upcoming races.

FIG. 4 shows an example of average speeds printed out for two entries from the fourth race at Brenner Park. Column 80 identifies the horses by name. Columns 81, 82 and 83 indicate the dates, racetrack and distances, respectively, for the previous races. Columns 84, 85, 86 and 87 give the average speeds for the four segments of the races, and column 88 indicates the finish position.

With this past performance, average speed data readily available on a regular basis, race fans may easily compare the average speeds of horses that are competing in an upcoming race. Comparison of average speeds is thought to be the most accurate manner of handicapping thoroughbred racehorses because average speeds provide the most objective and consistent indication of the running capability of a thoroughbred horse. Equipped with average speeds, race fans will have an increased chance of accurately predicting the winners of thoroughbred horse races.

For the benefit of the racetracks that participate in this system, the availability of reliable handicapping information in the hands of race fans will increase the volume of bets, and thereby increase the amount of money made.

Finally, this method of acquiring and disseminating average speed data to racing fans and/or racetracks is simple, accurate and relatively inexpensive.

While a preferred embodiment of the invention has been described, it is to be understood that the invention is not limited thereby and that in light of the present disclosure, various other alternative embodiments will be apparent to a person skilled in the art. For instance, while the invention has been described with respect to thoroughbred racehorses, it may also be adapted for use with quarter horse races, dog races, auto races, etc. Moreover, while the recording and playback steps have been described with videotape used as the visual recording media, it would also be possible to use film that is equipped with readable time code, though this method would necessitate additional costs associated with developing the film. Moreover, although the races could be broken down further into more than four segments, if desired, it is believed that four segments are sufficient to provide an accurate indication of a thoroughbred's running capability. Accordingly, it is to be understood that changes may be made without departing from the scope of the invention as particularly set forth and claimed.

I claim:

1. A method of acquiring handicapping information for thoroughbred racehorses comprising the steps of:

a) indexing a camera to marked, measured split positions along a racetrack during a race as a plurality of racehorses proceed around the racetrack, the split positions defining segments of the racetrack, the camera remaining aimed at each split position to record on video recording media each of said racehorses upon arrival at the respective split position and correlating time code information with the video recording media during camera indexing and recording;

b) subsequently reviewing the video recording media to identify each of said racehorses at each split position and to determine, using said correlated time code information, an elapsed time for each of said racehorses to traverse each segment of the racetrack; and c) calculating the average speeds of said racehorses for each segment of the racetrack traversed during the race, based on the elapsed times obtained from the reviewing step for the respective segments and the measured distances of the segments, thereby to obtain, for each of said racehorses, a plurality of average speeds equal in number to the segments.

2. The method of claim 1 and further comprising the steps of:

prior to steps a, b and c, surveying the racetrack to measure and mark split positions around the racetrack and the distances of the segments of the track located between successive split positions.

3. The method of claim 2 and further comprising the step of:

marking the split positions by painting a marker on a rail that encircles the inside of the racetrack.

4. The method of claim 2 and further comprising the step of:

storing in a computer memory the measured distances of the segments around the racetrack.

5. The method of claim 4 wherein the reviewing step further comprises:

viewing in a playback mode the video recording media to identify a first of said racehorses at a split position for a particular frame of the video recording media; and automatically reading a time code from said particular frame into a computer to match said read time code to a stored distance to facilitate calculation of an average speed for the previous segment of the racetrack for said first racehorse.

6. The method of claim 1 wherein the indexing step is performed automatically.

7. The method of claim 1 wherein the reviewing step further comprises:

inputting an elapsed time for each segment into a computing device to facilitate calculation of the average speeds from said segments.

8. The method of claim 1 wherein the reviewing step further comprises:

viewing in a playback mode the video recording media to identify a first of said racehorses at a split position for a particular frame of the video recording media; and reading a time code from said particular frame to facilitate calculation of an average speed for the previous segment of the racetrack for said first racehorse.

9. The method of claim 7 and further comprising the steps of:

recording an initial split position at a start of the race, prior to beginning of the race; and subsequently identifying a coded time frame of the video recording media associated with the start of the race to facilitate subsequent automatic calculation of average speeds.

10. The method of claim 1 and further comprising the steps of:

performing steps a, b and c for a plurality of racetracks to accumulate average speeds for a large number of competitors, and subsequently disseminating to racing fans the average speeds of selected competitors scheduled to compete in future races.

11. The method of claim 10 and further comprising the step of:

storing the measured distances of the segments of the plurality of racetracks.

12. A method for acquiring and disseminating thoroughbred racehorse handicapping information comprising the steps of:

surveying a racetrack to identify and measure split positions around the racetrack and distances therebetween, each pair of the split positions defining a segment of the racetrack residing therebetween;

indexing a camera to each successive split position during a race as a plurality of thoroughbred horses proceed around the racetrack, the camera remaining at each split position until the plurality of competing horses pass therethrough to record each of the horses on video recording media at the respective split position, the camera commencing recording before the start of the race and the video recording media also including time code information;

determining from the time code information on the video recording media an elapsed time for each of the horses for each of the successive segments of the racetrack, for the entire race;

calculating, for each of the horses, the average speed for each of the successive segments traversed during the race, based on the determined elapsed times for the respective segments and the known distances of the respective segments, thereby to obtain for each of the horses a plurality of average speeds equal in number to the segments; and disseminating to race fans, for at least one of the horses, the plurality of average speeds calculated from a previous race.

13. A method for acquiring and disseminating thoroughbred racehorse handicapping information comprising the steps of:

indexing a camera to a plurality of measured split positions located around a racetrack, the split positions defining a plurality of segments of the racetrack, the indexing step occurring during a race as a plurality of thoroughbred horses proceed around the track, the camera remaining at each split position until the plurality of competing horses arrive thereat, thereby to record each of the horses on video recording media at the respective split position, the camera commencing recording before the start of the race and the video recording media having time code information associated therewith;

reviewing the video recording media after the race to determine from the time code information an elapsed time for each of the horses for each of the successive segments of the track, for the entire race;

calculating, for each of the horses, the average speed for each of the successive segments traversed during the race, based on the determined elapsed times for the respective segments and the known distances of the respective segments, thereby to obtain for each of the horses a plurality of average speeds equal in number to the segments traversed during the race; and disseminating to race fans, for at least one of the horses, the plurality of average speeds calculated from a previous race.

* * * * *

UNITED STATES PATENT AND TRADEMARK OFFICE
CERTIFICATE OF CORRECTION

PATENT NO. : 5,513,103

DATED : April 30, 1996

INVENTOR(S) : Charlson

It is certified that error appears in the above-identified patent and that said Letters Patent are hereby corrected as shown below:

In column 12, line 9, claim 9, please delete the number "7" and insert the number --8--.

Signed and Sealed this

Eleventh Day of February, 1997

Attest:

BRUCE LEHMAN

*Attesting Officer*

*Commissioner of Patents and Trademarks*